(12) United States Patent
Alston et al.

(10) Patent No.: US 9,020,321 B2
(45) Date of Patent: Apr. 28, 2015

(54) WALL OUTLET HAVING ENCLOSED SERVICE CONNECTION

(71) Applicant: Tyco Electronics Corporation, Berwyn, PA (US)

(72) Inventors: Eric E. Alston, Fuquay-Varina, NC (US); Julian S. Mullaney, Raleigh, NC (US); William Alan Carrico, Raleigh, NC (US); Thomas Hoch, Fuquay-Varina, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 203 days.

(21) Appl. No.: 13/859,283

(22) Filed: Apr. 9, 2013

(65) Prior Publication Data

US 2013/0287358 A1 Oct. 31, 2013

Related U.S. Application Data

(60) Provisional application No. 61/622,276, filed on Apr. 10, 2012.

(51) Int. Cl.
*G02B 6/00* (2006.01)
*G02B 6/44* (2006.01)

(52) U.S. Cl.
CPC ................... *G02B 6/4441* (2013.01)

(58) Field of Classification Search
USPC .................. 385/133, 134, 135, 136, 137, 147
See application file for complete search history.

(56) References Cited

U.S. PATENT DOCUMENTS

| 4,874,904 | A | 10/1989 | DeSanti |
| 5,351,176 | A * | 9/1994 | Smith et al. ............. 361/679.27 |
| 6,315,598 | B1 | 11/2001 | Elliot et al. |
| 6,363,200 | B1 | 3/2002 | Thompson et al. |
| 6,379,166 | B1 | 4/2002 | Hagarty et al. |
| 7,292,763 | B2 | 11/2007 | Smith et al. |
| 7,361,052 | B2 | 4/2008 | Elliot et al. |
| 7,751,675 | B2 | 7/2010 | Holmberg et al. |
| 2002/0043033 | A1* | 4/2002 | Szyjkowski ................... 52/213 |
| 2010/0209065 | A1* | 8/2010 | Ruiz et al. .................... 385/135 |
| 2011/0155412 | A1* | 6/2011 | Clifton et al. .................. 174/59 |

* cited by examiner

Primary Examiner — Akm Enayet Ullah

(57) ABSTRACT

The present disclosure relates to an access box including a pivotal mounting panel to which a fiber optic adapter is mounted. The access box also includes a removable faceplate and a cover panel pivotable relative to the faceplate such that when the cover panel is in a closed position, the cover panel is substantially parallel to the faceplate, and wherein when the cover panel is in an open position, the cover panel is at an angle to the faceplate. The access box further includes an access panel pivotably secured to the cover panel. The access panel is movable between a first access panel position where the access panel blocks access to the adapter, and a second access panel position where the access panel allows access to the adapter.

20 Claims, 10 Drawing Sheets

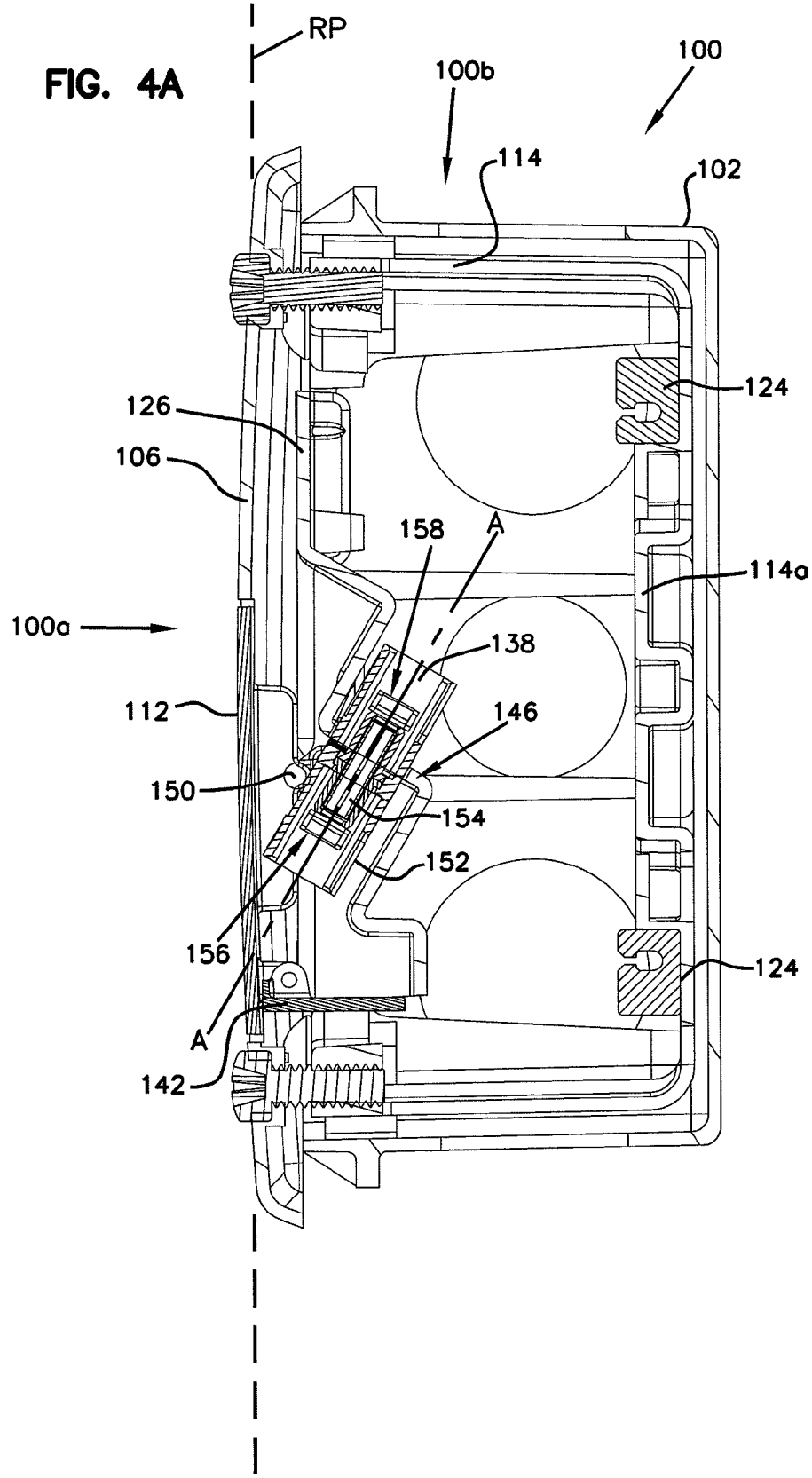

WALL OUTLET HAVING ENCLOSED SERVICE CONNECTION

CROSS-REFERENCE TO RELATED APPLICATION

The present patent application claims the benefit of U.S. Provisional Patent Application Ser. No. 61/622,276, filed Apr. 10, 2012, which application is hereby incorporated by reference in its entirety.

BACKGROUND

Various types of cables are used in building trades, information technology systems, or other applications to provide necessary or desired service to locations within a building or other structure. These cables may include fiber optic cables, coaxial cables, phone cables, electrical power cables, etc. At the point of service, free ends of the cable are typically connected to a cable connection device, terminal, adapter, outlet, etc., allowing an end user to selectively connect equipment to the available service. Exposed connectors, however, can be unsightly and encourage tampering by vandals or children. Additionally, in fiber optic cable applications, connectors on an active system will emit a light beam when that connector is not in use. Discrete caps may be used to cover the connector, but caps may be lost or stolen.

SUMMARY

In one aspect, the technology relates to an access box for a fiber optic connection device. The access box includes a support box having a front side and defines a plurality of openings configured to pass a cable from an exterior of the support box to an interior of the support box. The access box also includes a connector mounting panel pivotably connected to the access box, wherein the connector mounting panel has a mounting surface for mounting a cable connection device to the connector mounting panel. Furthermore, the access box includes a faceplate removably secured to the access box. The access box also includes a cover panel pivotable relative to the faceplate such that when the cover panel is in a closed position, the cover panel is substantially parallel to the faceplate, and wherein when the cover panel is in an open position, the cover panel is at an angle to the faceplate. In addition, the access box includes an access panel pivotably secured to the cover panel, wherein the access panel is movable between a first access panel position wherein the access panel blocks access to the adapter, and a second access panel position wherein the access panel allows access to the adapter.

In another aspect, the technology relates to a telecommunications device having a front face plate defining a front side of the telecommunications device. The telecommunications device also includes a cover panel pivotally moveable relative to the front face plate, the cover panel being pivotally moveable between a closed position where the cover panel is substantially parallel to a vertical reference plane corresponding generally to the front face plate and an open position where the cover panel is oriented at a first oblique angle relative to the vertical reference plane. Furthermore, the telecommunications device includes a fiber optic adapter positioned behind the front cover panel. The fiber optic adapter defines a first connector port and a second connector port. The fiber optic adapter also defines a connector insertion axis aligned at a second oblique angle relative to the vertical reference plane. The telecommunications device also includes an access panel carried by the cover panel as the cover panel is pivoted between the open position and the closed position. The access panel is pivotally moveable relative to the cover panel between a first access panel position and a second access panel position, wherein the access panel intersects the connector insertion axis when the access panel is in the first access panel position, and wherein the access panel does not intersect the connector insertion axis when the access panel is in the second access panel position.

These and other features and advantages will be apparent from a reading of the following detailed description and a review of the associated drawings. It is to be understood that both the forgoing general description and the following detailed description are explanatory only and are not restrictive of the broad aspects of the disclosure.

BRIEF DESCRIPTION OF THE DRAWINGS

There are shown in the drawings, embodiments which are presently preferred, it being understood, however, that the technology is not limited to the precise arrangements and instrumentalities shown.

FIGS. 4A-4C are side sectional views of the access box of FIG. 1A in various access positions.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1A:
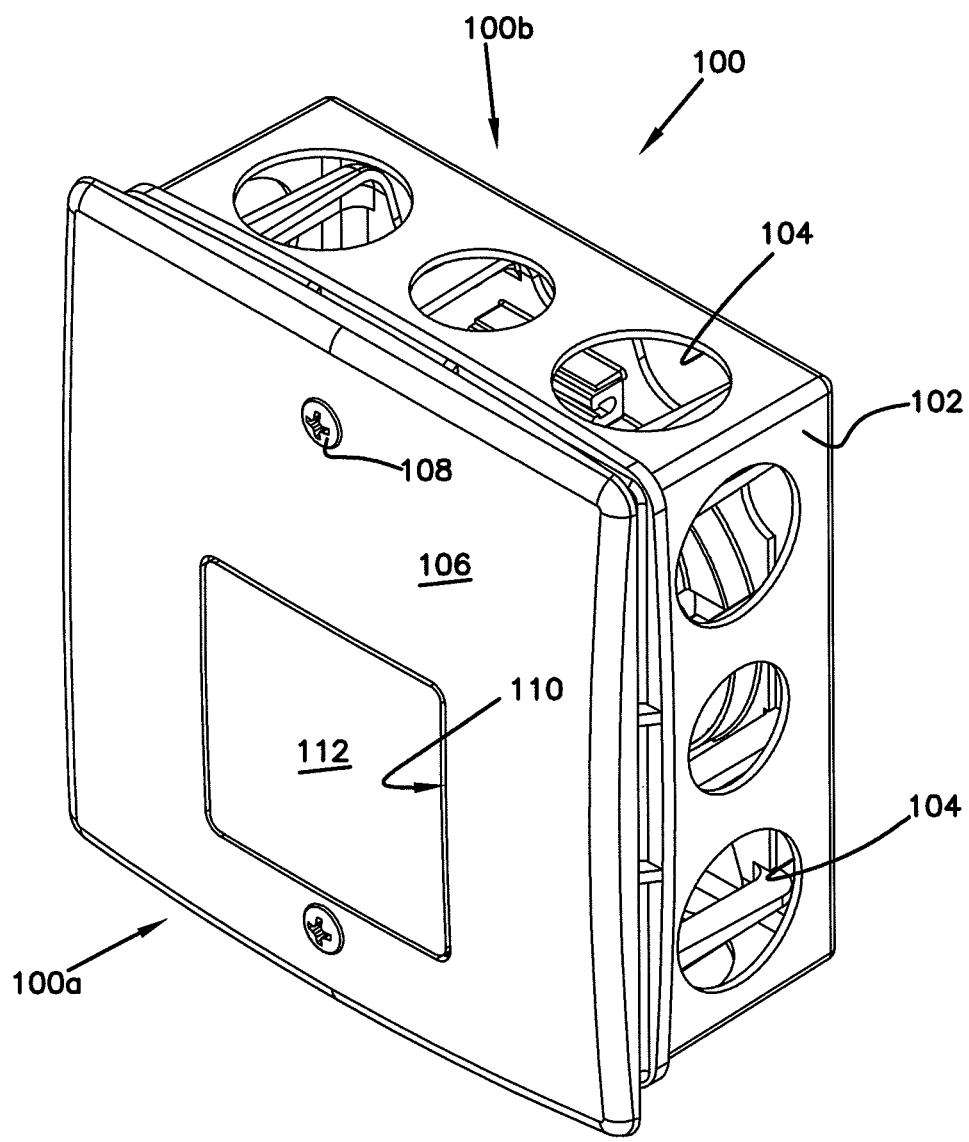
FIG. 1A is a front perspective view of a cable access box having a cover panel in a closed position.
Figure 1B:
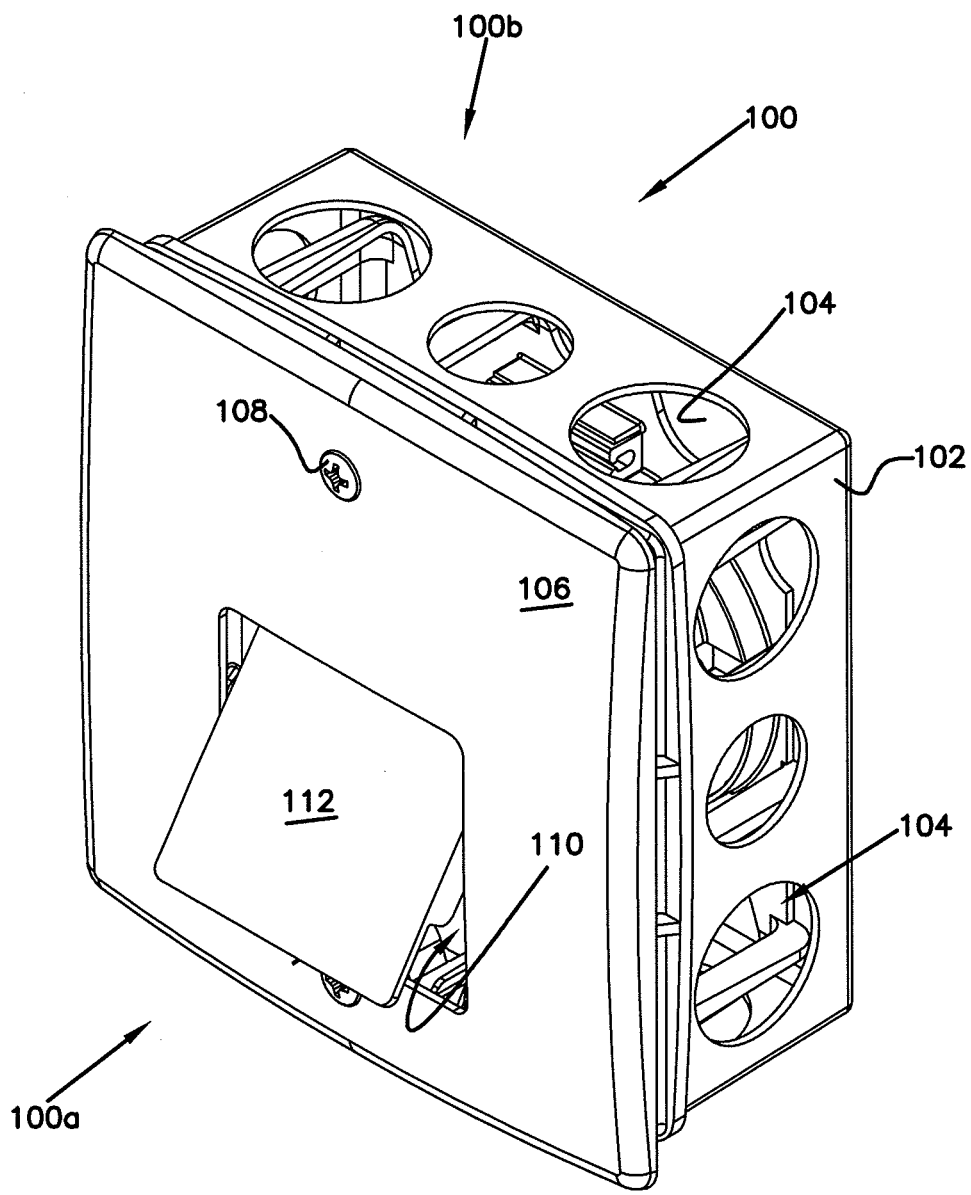
FIG. 1B is a front perspective view of the access box of FIG. 1B having the cover panel in an open position.

FIGS. 1A and 1B depict a telecommunications device configured as a covered cable access box 100. In general, the access box 100 (and the components thereof) includes a front side 100a and a top side 100b. The access box 100 includes a mounting box 102 which may be an electrical box typically used in the building construction industry for electrical power distribution. The mounting box 102 may define a number of openings 104 on one or more sides, or on the rear of the mounting box 102. The openings 104 allow cable to pass into the mounting box 102. A faceplate 106 may be secured to the access box 100 via a number of screws 108, press-fit connections, or other connection elements. The faceplate 106 defines an opening 110 in which is located a pivoting cover panel 112, the operation of which is described below. FIG. 1B depicts this cover panel 112 in an open position, where it is positioned at an angle relative to the faceplate 106, such that the cover panel 112 is at an angle oblique to a vertical face of the faceplate 106.

Figure 2:
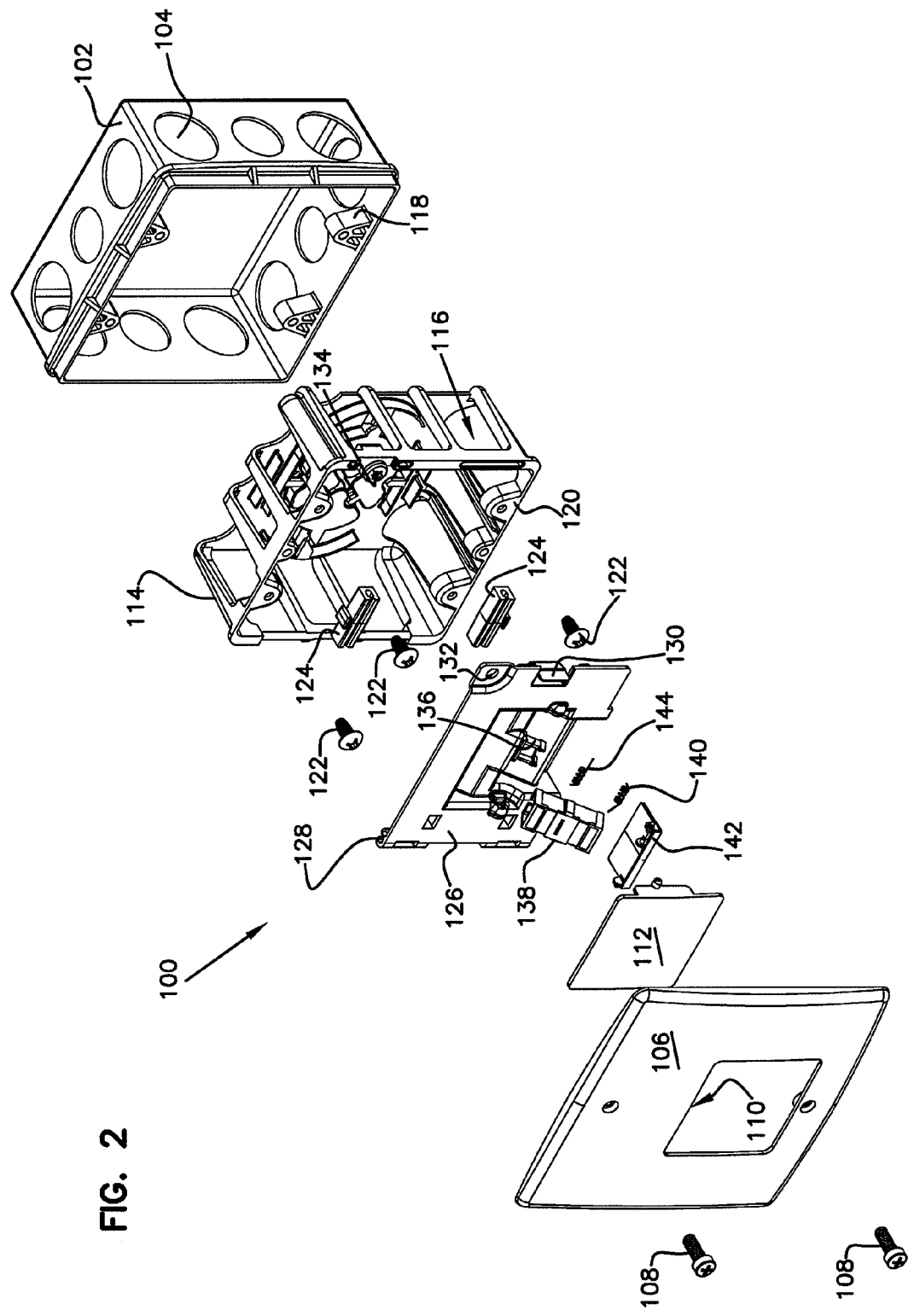
FIG. 2 is an exploded perspective view of the access box of FIG. 1A.

FIG. 2 depicts an exploded perspective view of the access box 100. The mounting box 102 is configured to receive a support box 114. Like the mounting box 102, the support box 114 defines a number of openings 116 to allow a cable to be inserted from an exterior of the support box 114 to an interior thereof. Although the access box 100 utilizes both a mounting box 102 and a support box 114, other embodiments that utilize only one or the other are contemplated. The mounting box 102 includes a number of projections 118 that are configured to align with projections 120 on the support box 114. Either or both of these projections 118, 120 may be configured to receive one or more screws 122, press fit connectors, or other elements to secure the various components of the access box 100 relative to each other. One or more splice holders 124 may be located within the interior of the support box 114, and may be discrete from the support box 114 or manufactured integrally therewith. Cable/fiber management structures can be provided within the support box 114. For example, one or more spooling structures can be provided within the support box 114 for spooling excess cable/fiber in a looped configuration without violating minimum bend radius requirements of the fiber/cable.

A connector mounting panel 126 is secured to the support box 114. In the depicted embodiment, the connector mounting panel 126 is pivotably connected at a hinge 128 that may be located along a top, side, or bottom portion of the connector mounting panel 126. The hinge 128 allows pivoting movement of the connector mounting panel 126 around a hinge axis H (see FIG. 3). In alternative embodiments that do not utilize a support box, the connector mounting panel 126 may be pivotably secured to the mounting box 102. In the depicted embodiment, the connector mounting panel 126 includes a latch 130 located opposite the hinge 128 that may hold the connector mounting panel 126 in a closed position, releasably secured to the support box 114. In the closed position, the connector mounting panel 126 prevents access to the interior of the support box 114, discouraging tampering with the cables located therein. An opening 132 may be used to receive a screw 134 to more robustly secure the connector mounting panel 126 to the support box 114, so as to further deter tampering. In other embodiments, press fit connections, or other securing elements may be used to secure the connector mounting panel 126 against pivoting.

The connector mounting panel 126 includes a mounting surface 136 for a cable connection device 138, which in this case is a fiber optic adapter. A biasing element 140, such as a spring, may be used to bias the cover panel 112 toward a closed position, as described in more detail below. An access panel 142 is carried by and pivotably secured to the cover panel 112, and may also be biased with a biasing element 144. Typically, the access panel biasing element 144 biases the access panel 142 into a first access panel position such that the access panel 142 is positioned substantially orthogonal to the cover panel 112. Either or both of the biasing elements 140, 144 may include at least one of a coil spring, an elastomeric element, a leaf spring, and a torsion spring. In other embodiments, the biasing elements 140, 144 may be incorporated into a single unitary part, such as a more complex leaf spring.

Figure 3:
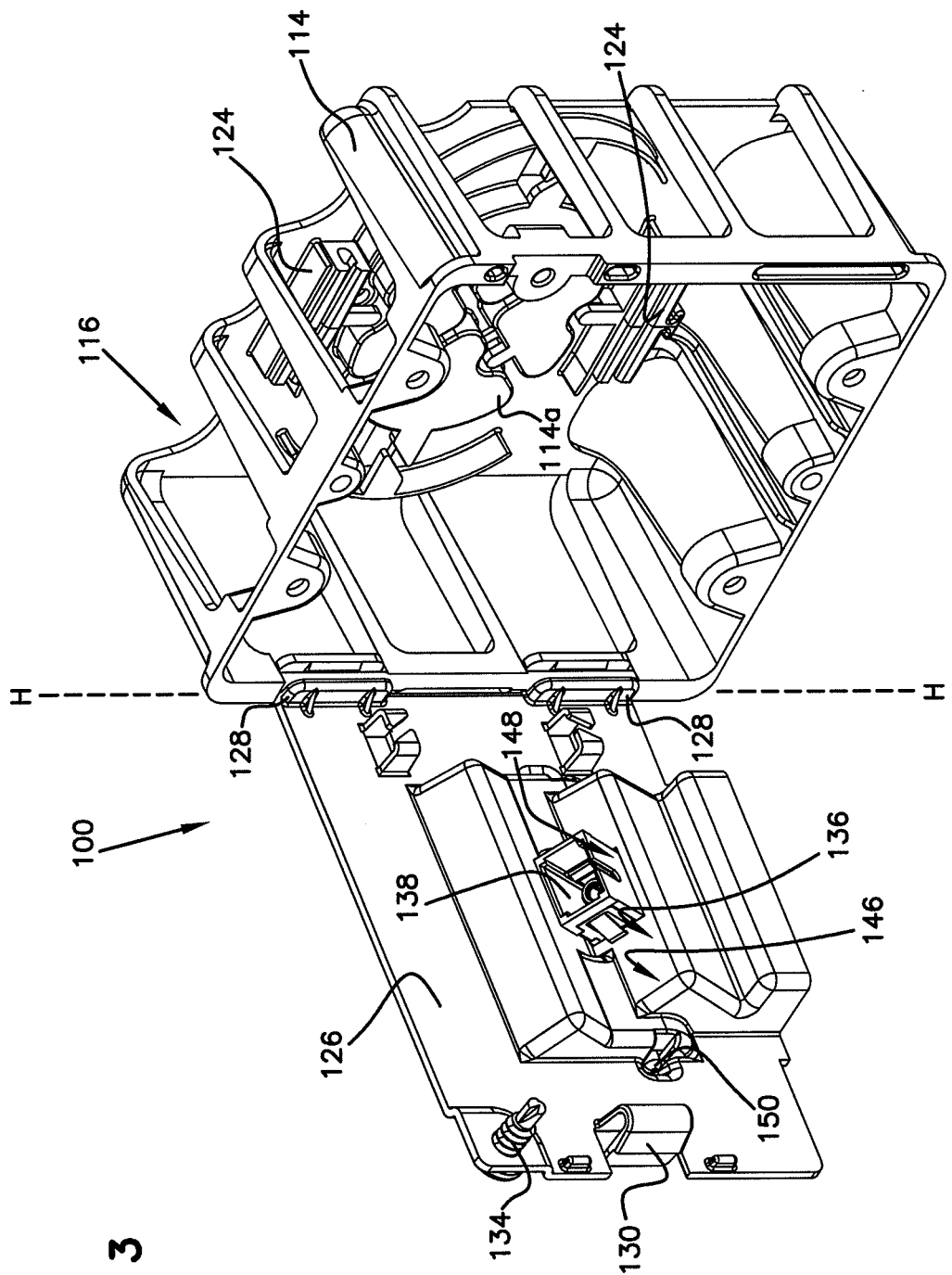
FIG. 3 is a perspective view of the access box of FIG. 1A having a cable mounting panel in an open position.

FIG. 3 depicts the access box 100 of FIG. 1A, notably the support box 114 and the connector mounting panel 126 pivotably mounted thereto in an open position. In the open position, access to the interior of the support box 114 is possible for service or other purposes. A number of elements depicted in FIG. 3 are already described above, accordingly, these elements are generally not described further. The interior of the support box 114 may define a plurality of cable management structures 114a, channels, elements, etc., which may be used to secure the cable inserted therein against movement or excessive bending, which may damage the cable. The hinge 128 is integral with the connector mounting panel 126 and is secured directly to an outer portion of the support box 114 for pivotal movement about the hinge axis H. If desired, a spring may bias the connector mounting panel 126 into a closed position, where the latch 130 is in contact with the support box 114. As can be seen, the connector mounting panel 126 includes at least one angled surface 146, and defines an opening 148 through which the cable connection device 138 may pass. In certain embodiments, the connection device 138 can be secured in the opening 148 by a snap-fit connection. In the depicted embodiment, the angled surface 146 is the same as the mounting surface 136. The functionality of this angled surface 146 is described in further detail with reference to the following figures. The cover panel 112 (not visible in FIG. 3) is connected to the connector mounting panel 126 at a pivot 150. In alternative embodiments, the cover panel 126 may be pivotably connected to an interior surface of the faceplate 106

Figure 4B:
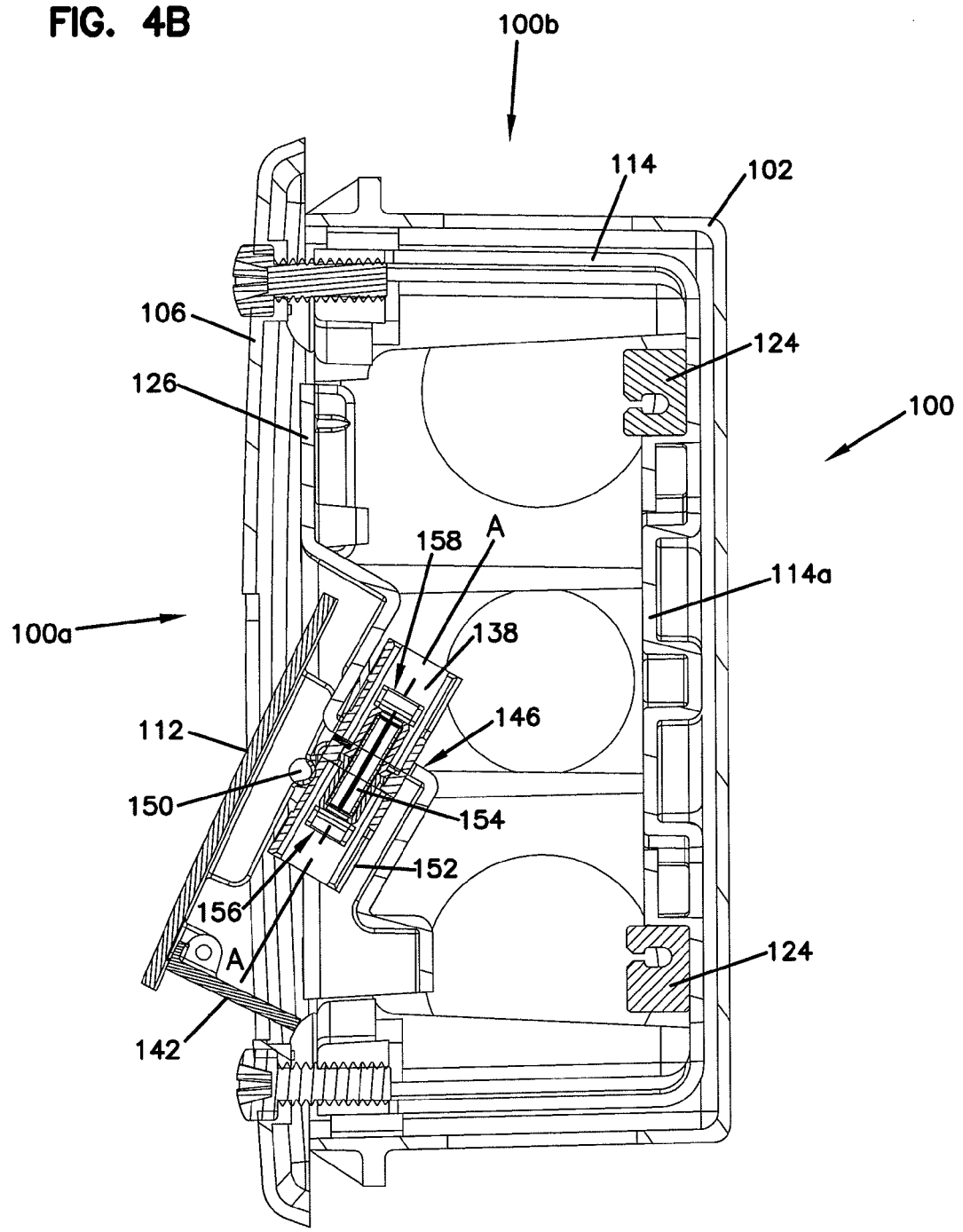
Figure 4C:
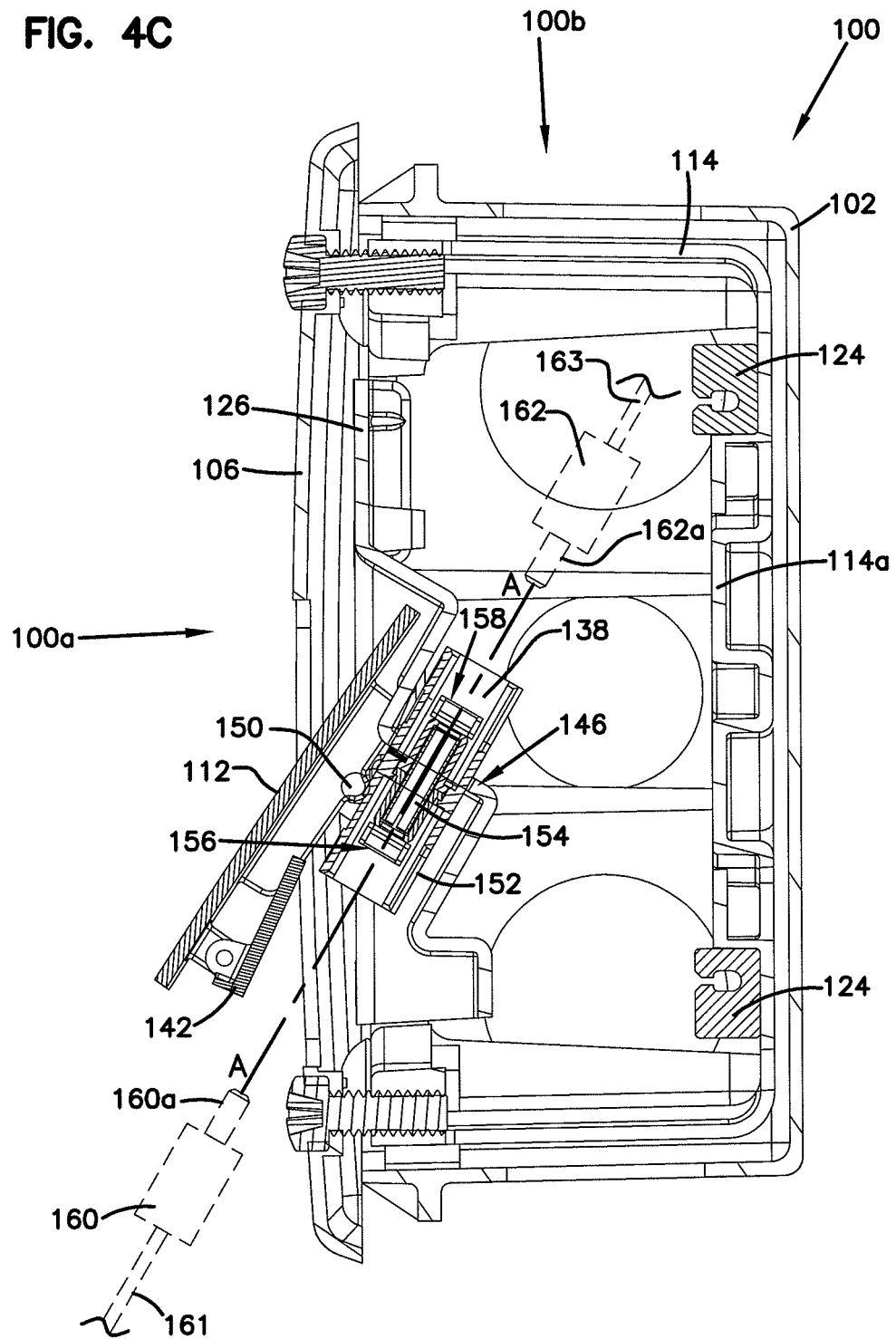

FIG. 4A-4C depict side sectional views of the access box 100 with the cover panel 112 and access panel 142 in various positions. The front side 100a and the top side 100b are also depicted. FIG. 4A depicts the cover panel 112 in a closed position and the access panel 142 in a first access panel position. In the closed position, the cover panel 112 is substantially parallel to the faceplate 106. Additionally, in the first access panel position, the access panel 142 extends substantially orthogonally from the cover panel 112. The cable connection device 138, in this case a fiber optic adapter, includes an outer body 152 and an inner sleeve 154. The inner sleeve 154 includes an outer end 156 for connection to an exterior cable and an inner end 158 for connection to the cable inside the access box 100. For example, as shown at FIG. 4C, the outer end 156 can receive a ferrule 160a of a connector 160 terminated to an exterior cable 161 and the inner end 158 can receive a ferrule 162a of a connector 162 terminated to an internal cable 163 routed within the access box 100.

When the connector 162 is inserted in the inner port of the cable connection device 138, light signals conveyed therethrough will be emitted in a forward direction, generally toward the front side 100a, and a downward direction, generally away from the top side 100b. Since the cable connection device 138 is fixed to the mounting surface 136 of the connector mounting panel 126, any light directed out from the fiber optic connector 162 will be directed at the cover plate 112 (generally parallel to or coaxial with an axis A oblique to the faceplate 106, as defined by the cable connection device 138). The angle at which axis A is oblique to the faceplate 106 may, in certain embodiments, be substantially parallel to the maximum angle that the cover plate 112 may be opened. It should be noted that the angled surface 146 functions to angle the axis A forwardly and downwardly. This angling can assist in limiting bending of the cable 161. The axis A can be referred to as a connector insertion axis. The axis A is also oriented at an oblique angle relative to a vertical reference plane RP that generally corresponds to a front side of the access box 100.

FIG. 4B depicts the access box 100 with the cover panel 112 in the open position. In this position, a portion of the cover panel 112 above the pivot 150 may be pressed inward, thus pivoting the portion below the pivot 150 away from the faceplate 106. This may occur when a person wishes to obtain access to the cable connection device 138. With the cover plate 106 in the open position, light from the cable connection device 138 (again, as defined by the axis A), is directed toward the access panel 142, thus preventing light from exiting the access box 100. In the depicted embodiment, in the second access panel position, the access panel 142 is substantially parallel to the angled surface 146, thus making the access panel 142 substantially orthogonal to any light emitted from the connector 138. In other embodiments, however, the access panel 142 need only intersect the emitted light to prevent escape thereof from the interior of the access box 100. In the first access position, the access panel 142 is generally orthogonal with respect to the cover plate 112. The access panel 142 pivotally connects to the cover plate 112 adjacent a lower end of the cover plate 112. As shown at FIG. 4B, when the cover plate 112 is in the open position, the cover plate 112 is generally parallel to the axis A (i.e., the light beam path) and does not intersect the axis A.

Should it be desirable to access the cable connection device 138 (for connection to other remote equipment, for example), the access panel 142 may be moved from the first access panel position depicted in FIG. 4B to a second access panel position depicted in FIG. 4C. In the second access panel position, the access panel 142 no longer intersects the emitted light defined by axis A and a cable 161 may be connected to the outer port 156 of the cable connection device 138. The dual action movement required (first of the cover panel 112, then of the access panel 142) helps prevent inadvertent emission of the light by a person potentially unfamiliar with the operation of fiber optic systems. FIG. 4C also depicts an inner cable 163, which is connected to the inner port 158 of the cable connection device 138.

Figure 5A:
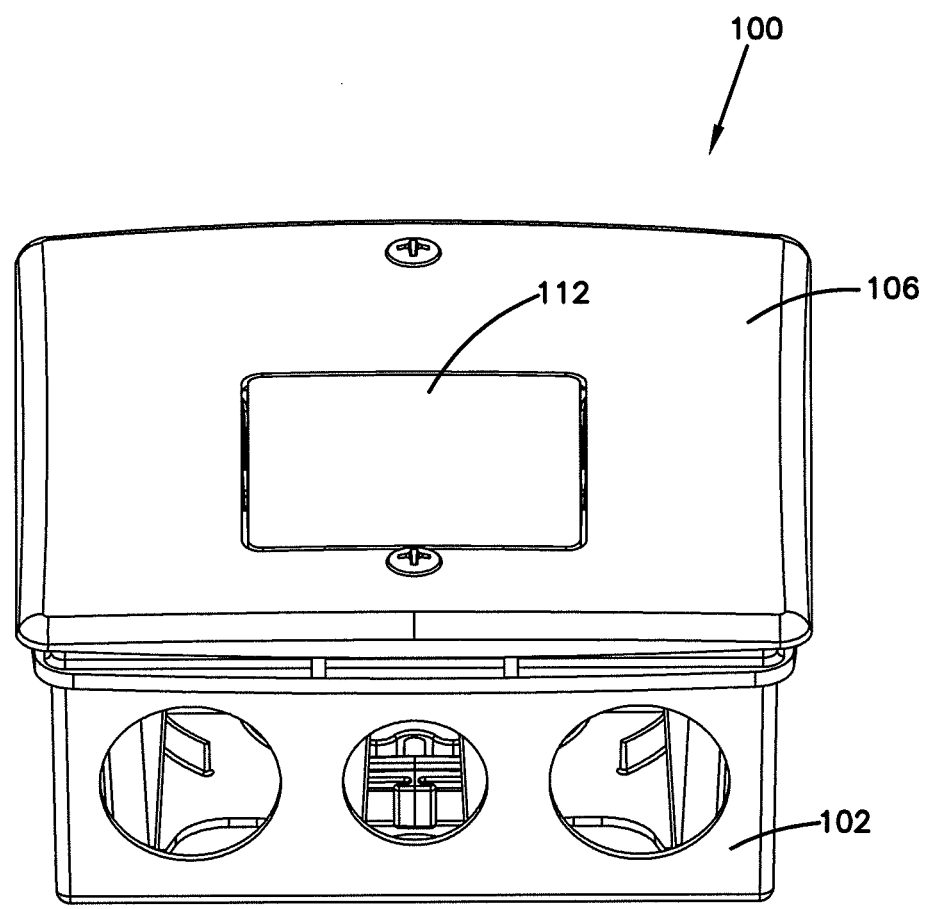
FIGS. 5A-5C are bottom perspective views of the access box of FIG. 1A in various access positions.
Figure 5B:
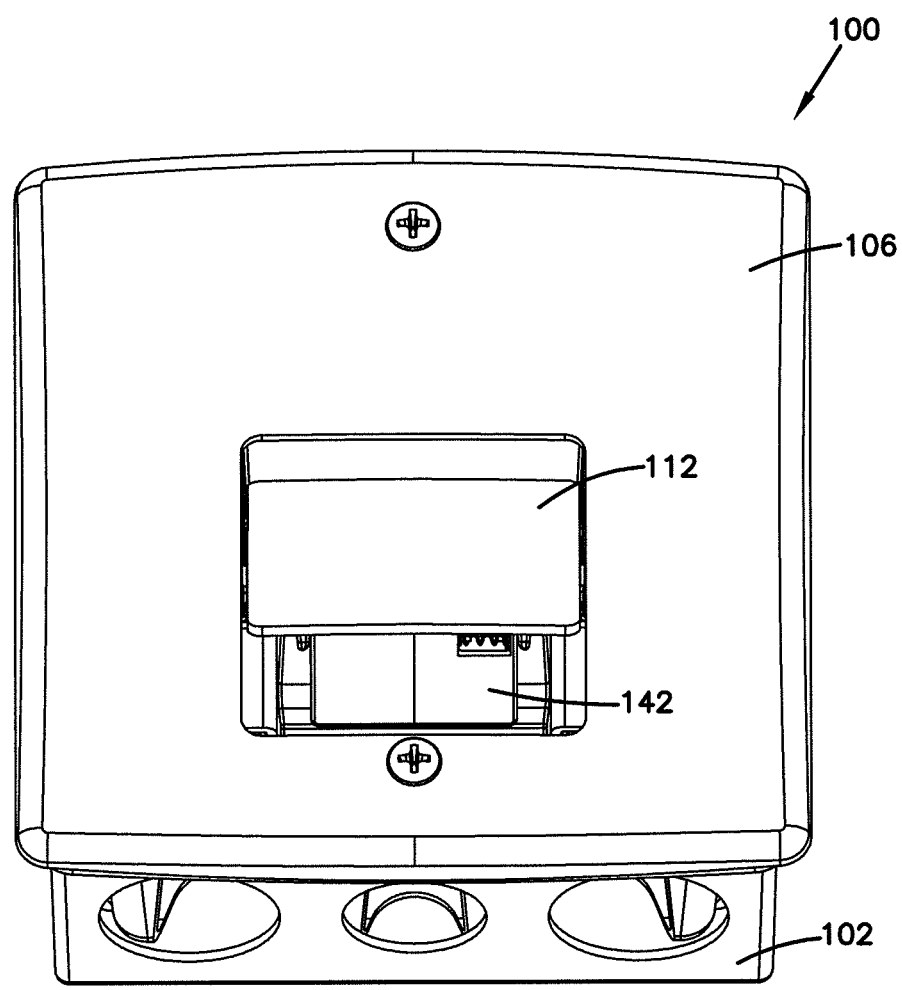
Figure 5C:
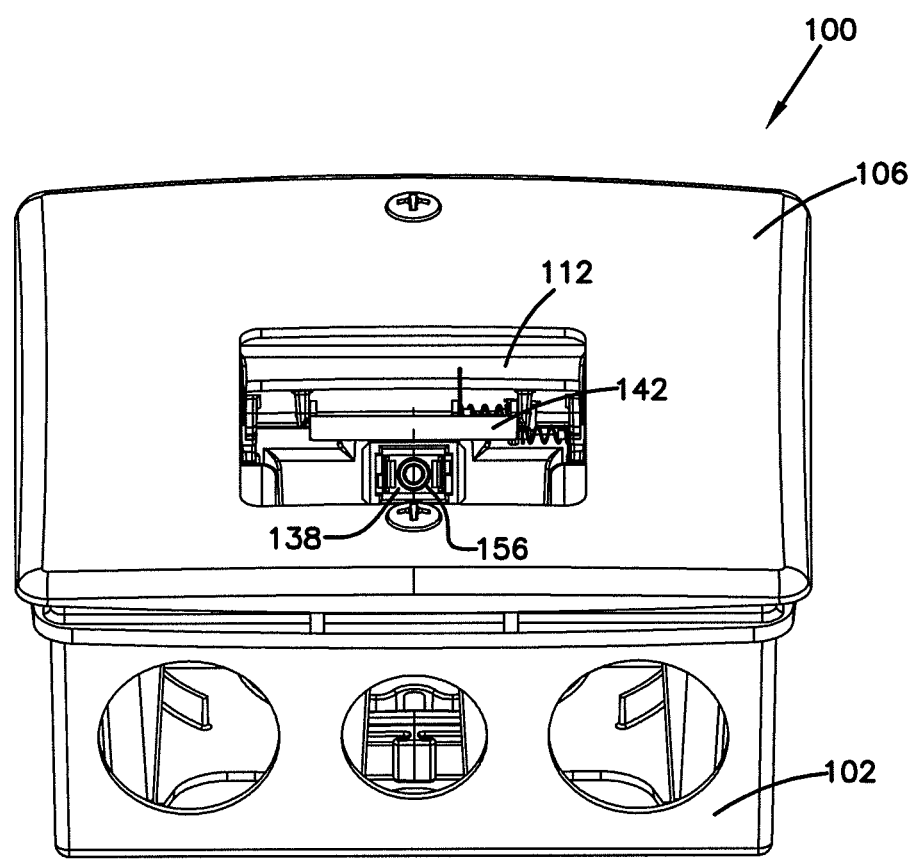

FIGS. 5A-5C depict bottom perspective views of the access box 100. In FIG. 5A, the cover panel 112 is in the closed position and the cable connection device is not visible (therefore, light will not be emitted from the access box 100). In FIG. 5B, the cover panel 112 has been moved to the open position. However, the position of the access panel 142 in the first access panel position prevents light from being emitted from the access box 100, and otherwise blocks access to the cable connection device 138. FIG. 5C depicts the cable connection device 138, as viewed from a bottom of the access box 100. In this case, the access panel 142 has been moved to the second access panel position, thus allowing emitted light to leave the access box 100. The second access panel position now allows access to the outer interface 156 of the cable connection device 138, and enables connection of a cable thereto.

The access boxes may be any size typically used for single or multi-gang switches or outlets, or custom sizes may be fabricated, depending on the particular application. Additionally, multiple cables or types of cables may be routed to the box, with multiple connectors located on the connector mounting panel. In certain embodiments, the mounting box and/or support box may be manufactured with punch outs on all sides of the box, such that cable may be inserted in any location.

Although the access boxes described herein are typically installed behind wall panels, surface-mounted installations may also be utilized if, for example, an access box is installed in an unfinished room or other space. Although access boxes used primarily for fiber optic distribution systems are described herein, they also may be utilized for any service where it may be desirable to hide the connector. For example, the system may be used for coaxial cable, building electrical power, etc. The described access boxes not only prevent light from being emitted from exposed fiber optic connectors, but also are aesthetically pleasing, and help reduce damage to the connector, unauthorized access thereto, or build-up of dust or debris on the connector. In that regard, the access boxes described herein have applications beyond fiber optic systems. With sufficient water shedding surfaces and gaskets, the access boxes may also be made substantially weatherproof, making them useful in outdoor or other wet applications.

The materials used for the boxes and components described herein may be the same as those typically used for electrical boxes used in the construction industry. These may include injection molded plastics and metals such as zinc and steel. Additionally, corrosion resistant metals such as stainless steel may be used if the system is to be used in environments where such resistance to corrosion is required or desired. These environments may include outdoor applications, marine environments, etc.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. An access box for a fiber optic connection device, the access box comprising:
   a support box comprising a front side and defining a plurality of openings configured to pass a cable from an exterior of the support box to an interior of the support box;
   a connector mounting panel pivotably connected to the access box, wherein the connector mounting panel comprises a mounting surface for mounting a cable connection device to the connector mounting panel;
   a faceplate removably secured to the access box;
   a cover panel pivotable relative to the faceplate such that when the cover panel is in a closed position, the cover panel is substantially parallel to the faceplate, and wherein when the cover panel is in an open position, the cover panel is at an angle to the faceplate; and
   an access panel pivotably secured to the cover panel, wherein the access panel is movable between a first access panel position wherein the access panel blocks access to the adapter, and a second access panel position wherein the access panel allows access to the adapter.

2. The access box of claim 1, further comprising a securing element for securing the connector mounting panel to the access box.

3. The access box of claim 2, where the securing element comprises at least one of a latch, a press-fit connection, and a screw.

4. The access box of claim 1, wherein the connector mounting panel comprises an angled surface, and wherein the mounting surface is located on the angled surface.

5. The access box of claim 4, wherein the cable connection device comprises a fiber optic adapter.

6. The access box of claim 5, wherein fiber optic adapter defines an axis.

7. The access box of claim 6, wherein when the cover panel is in the open position and the access panel is in the first access panel position, the access panel is substantially parallel to the angled surface.

8. The access box of claim 6, wherein when the cover panel is in the open position and the access panel is in the first access panel position, the axis intersects the access panel.

9. The access box of claim 1, further comprising a cover panel biasing element for biasing the cover panel toward the closed position.

10. The access box of claim 9, further comprising an access panel biasing element for biasing the access panel towards the first access panel position.

11. The access box of claim 10, wherein the cover panel biasing element and the access panel biasing element comprise a unitary part.

12. The access box of claim 10, wherein at least one of the cover panel biasing element and the access panel biasing element comprise at least one of a coil spring, an elastomeric element, a leaf spring, and a torsion spring.

13. The access box of claim 1, wherein the support box comprises a splice holder.

14. The access box of claim 1, wherein the support box interior is configured to store a length of the cable such that the cable remains connected to the cable connection device when the connector mounting panel is in a closed position and an open position.

15. The access box of claim 1, further comprising the cable connection device.

16. The access box of claim 1, further comprising a mounting box configured to receive the support box.

17. The access box of claim 6, wherein the access box further comprises a top side and wherein the fiber optic adapter comprises an outer port, wherein the outer port is positioned away from the top side and toward the faceplate.

18. A telecommunications device comprising:
a front face plate defining a front side of the telecommunications device;
a cover panel pivotally moveable relative to the front face plate, the cover panel being pivotally moveable between a closed position where the cover panel is substantially parallel to a vertical reference plane corresponding generally to the front face plate and an open position where the cover panel is oriented at a first oblique angle relative to the vertical reference plane;
a fiber optic adapter positioned behind the front cover panel, the fiber optic adapter defining a first connector port and a second connector port, the fiber optic adapter defining a connector insertion axis aligned at a second oblique angle relative to the vertical reference plane; and
an access panel carried by the cover panel as the cover panel is pivoted between the open position and the closed position, the access panel being pivotally moveable relative to the cover panel between a first access panel position and a second access panel position, wherein the access panel intersects the connector insertion axis when the access panel is in the first access panel position, and wherein the access panel does not intersect the connector insertion axis when the access panel is in the second access panel position.

19. The telecommunications device of claim 18, further comprising a first biasing structure for biasing the cover panel toward the closed position and a second biasing structure for biasing the access panel toward the first access panel position.

20. The telecommunications device of claim 18, wherein the first and second oblique angles are substantially equal to one another.

* * * * *